Patented Jan. 6, 1953

2,624,713

UNITED STATES PATENT OFFICE 2,624,713

IRON FLUORIDE-MANGANESE FLUORIDE AROMATIZING CATALYST

Forrest R. Hurley, Jamestown, Ohio, assignor to Monsanto Chemical Company, St. Louis, Mo., a corporation of Delaware No Drawing. Application September 24, 1949, Serial No. 117,739

8 Claims. (Cl. 252—441)

This invention relates to improved aromatizing catalysts, and to the preparation thereof. More particularly the invention relates to the preparation and use of improved iron-manganese fluoride catalysts having increased activity and being capable of auto-regeneration during use.

As is well known, it is a common source of difficulty in catalytic operations to have the catalyst decrease in activity during operation. For this reason it is often necessary to discontinue the desired chemical reaction and to devote time to the regeneration of the catalyst. It is, therefore, common practice to carry out catalytic operations with a multiplicity of catalytic reactors so that a process may be employed in which a regeneration step is practiced upon some of the masses of catalytic bodies, while other masses of the catalytic bodies are utilized in the desired chemical process. It is an object of the present invention to reduce the amount of regeneration which is necessary in aromatizing operations. It is another object of the invention to provide a catalyst having high activity in cyclization or aromatizing operations, such as in the production of toluene from normal heptane, and other analogous reactions in which aromatic compounds are obtained from aliphatic compounds.

It has now been found that an effective aromatizing catalyst capable of auto-regeneration may be prepared by the provision of a combination of iron and manganese fluorides. Such catalysts, when operated in an aromatizing process in which small proportions of oxygen and hydrogen fluoride are present, have been found to undergo a continuous transformation or regeneration. Although the nature of the chemical compound which is present during the catalytic aromatizing operation is not completely understood, regeneration of the catalytic surface has been found to occur through a continuous oxidation of the iron and manganese components of the catalyst as induced by the presence of small amounts of oxygen in the feed gas mixture. Concommitant with the oxidation of iron and manganese, it has been found that production of fluoride compounds occurs as a continuous cycle when hydrogen fluoride is added in volumetric excess over the oxygen in the entering feed gases. Accordingly, it is possible to present a continuously active and regenerated catalytic surface, since the continuous oxidation by means of small amounts of oxygen sweeps the catalytic surface clean of impurities and decomposition products. At the same time such oxidized salts of the iron and manganese components are rendered particularly susceptible to reaction with the hydrogen fluoride which is added in the reaction. For this reason the catalyst continuously presents an active surface so that the catalytic process may be carried out with greater efficiency. The above process of aromatizing aliphatic hydrocarbons in the presence of small amounts of oxygen and of hydrogen fluoride over the catalyst of the present invention is described in greater detail in copending application Serial No. 117,740, filed September 24, 1949, assigned to the same assignee as is the present patent application, now Patent No. 2,598,642.

The iron manganese fluoride catalyst of the present invention may be prepared from a gross mechanical mixture of the iron and manganese hydroxides or from other compounds which react with hydrogen fluoride to yield the desired iron and manganese fluorides. The proportions of the iron and manganese components are not critical and may be varied in the range of 10% to 90% by weight of iron calculated as the metal. A preferred range consists of 30% to 60% by weight of iron, relative to the iron and manganese present in the catalyst. The catalyst may be prepared as a particulate form of the iron and manganese fluorides or may be employed in a dispersed form on a catalytic carrier such as charcoal, alumina, silica and the like. It is essential that the carrier itself shall not be active in the aromatizing reaction period, so that it may be desirable in the case of some carriers to pretreat the carrier by a high temperature transformation to render the carrier inactive in the aromatizing reaction. The final form of the catalyst as utilized in catalytic processes may occur in massive or formed particles, such as pelleted or extruded fragments of suitable size, such as for example 4-8 mesh and 2-4 mesh. The catalyst may also be utilized in finely divided form for dispersion in a gas stream, such as in a fluid catalytic process.

As examples of the method of preparation of the present catalyst, although not restrictive as to the scope of the invention, the following examples illustrate embodiments of the invention:

Example 1

50 grams of ferrous carbonate was prepared by dissolving ferrous sulfate in water and then precipitating the carbonate by addition of ammonium carbonate solution in excess. The precipitate of ferrous carbonate was washed several times and was then partially air dried. A mixture was prepared of the ferrous carbonate together with 50 grams of manganese carbonate. A thick paste was formed of the two carbonates by adding a minimum amount of water. The carbonates were then mixed with about 50 grams of charcoal as 6-8 mesh particles. Slurrying and mixing of the carbonates gave a heavy, uniform coating of the iron and manganese carbonates upon the charcoal. The product was oven dried at 80° C. and drying was then completed at 110° C.

The catalyst mixture of ferrous and manganese carbonates was prepared for use by heating the carbonates to 300° C. while passing in gaseous oxygen and a volumetric excess of hydrogen fluoride. A sample of the carbonates amounting to 406 mg. was treated at 300° C. with 25 ml. per minute of oxygen and 70 mm. of hydrogen fluoride per minute for two hours, at which time the formation of fluorides was sufficient to permit the material to be used as an aromaticizing catalyst.

*Example 2*

The above catalyst was tested in the aromatizing of normal heptane by supplying to the catalytic mixture of fluorides a feed gas consisting of 90% n-heptane, 4% oxygen and 6% hydrogen fluoride. An examination of the catalyzed product showed that a reaction of the aliphatic compound, n-heptane, had occurred to form the aromatic compound, toluene. The fractions of products obtained upon distillation of the recovered products showed that the aromatic cut contained approximately 42% of unsaturated compounds corresponding to toluene. Further examination of the product by means of infra-red absorption and ultra-violet absorption analytical methods showed toluene to be the preponderant product obtained.

*Example 3*

A preparative method utilizing the hydroxides is illustrated by the mixture of 50 grams of ferrous hydroxide and 50 grams of manganese hydroxide. This catalyst was treated with gaseous oxygen and gaseous hydrogen fluoride in order to convert the hydroxides to fluorides. The above catalyst had a good activity in the conversion of aliphatic hydrocarbons to aromatic compounds, such as in the aromatizing n-heptane to toluene.

In the above examples I have described how iron manganese catalysts prepared from various iron manganese compounds may be treated to obtain iron manganese fluorides. The concentrations of the individual iron and manganese components are not critical and mixtures may be obtained in which the proportion of iron to manganese varies from 10% to 90% by weight of the former in the mixture. The starting materials or original iron and manganese compounds are not critical and may be any conveniently available compounds which react with oxygen and hydrogen fluoride to yield the corresponding fluorides. Preferred compounds which may be utilized are the group of iron carbonates, iron hydroxides, and iron nitrates and the group of manganese carbonates, manganese hydroxides and manganese nitrates.

Since many changes may be made in the above process and catalysts without departing from the scope of the invention, it is intended that all matter contained in the above description shall be illustrative, and not in a limiting sense, and that the invention is to be construed broadly and restricted solely by the scope of the prior art and spirit of the appended claims.

What is claimed and is desired to be protected by Letters Patent of the United States is:

1. A catalytic composition comprising an admixture of iron fluoride and manganese fluoride obtained by reacting an iron compound and a manganese compound with oxygen and a volumetric excess of hydrogen fluoride.

2. A catalytic composition comprising the combination of iron fluoride and manganese fluoride by reacting an iron compound of the group consisting of iron carbonates, iron hydroxides and iron nitrates and a manganese compound of the group consisting of manganese carbonates, manganese hydroxides and manganese nitrates with oxygen and hydrogen fluoride in admixture in which the said hydrogen fluoride is in volumetric excess of said oxygen to yield a mixture in the proportions of from 10 percent to 90 percent by weight of iron, calculated as the metal.

3. A catalytic composition comprising iron fluoride in combination with manganese fluoride by reacting an iron compound of the group consisting of iron carbonates, iron hydroxides and iron nitrates and a manganese compound of the group consisting of manganese carbonates, manganese hydroxides and manganese nitrates with oxygen and hydrogen fluoride in admixture in which the said hydrogen fluoride is in volumetric excess of the said oxygen to yield a mixture in the proportions of from 30 percent to 60 percent by weight of iron, calculated as the metal.

4. A process for the preparation of an aromatizing catalyst comprising reacting an iron compound and a manganese compound with oxygen and a volumetric excess of hydrogen fluoride to yield a mixture of ferric fluoride and manganous fluoride.

5. A process for the preparation of an aromatizing catalyst comprising reacting an iron compound of the group consisting of iron carbonates, iron hydroxides, and iron nitrates, and a manganese compound of the group consisting of manganese carbonates, manganese hydroxides, and manganese nitrates with oxygen and hydrogen fluoride in mixtures in which the said hydrogen fluoride is in volumetric excess of the said oxygen to yield a mixture of iron fluorides and manganese fluorides.

6. A process for the preparation of an aromatizing catalyst comprising the reaction of a mixture of iron carbonate and manganese carbonate with a mixture of oxygen and hydrogen fluoride in which the said hydrogen fluoride is in volumetric excess of the said oxygen to yield a mixture of iron fluorides and manganese fluorides.

7. A process for the preparation of an aromatizing catalyst comprising the reaction of a mixture of iron hydroxide and manganese hydroxide with a mixture of oxygen and hydrogen fluoride in which the said hydrogen fluoride is in volumetric excess of the said oxygen to yield a mixture of iron fluorides and manganese fluorides.

8. A process for the preparation of an aromatizing catalyst comprising the reaction of a mixture of iron nitrate and manganese nitrate with a mixture of oxygen and hydrogen fluoride in which the said hydrogen fluoride is in volumetric excess of the said oxygen to yield a mixture of iron fluorides and manganese fluorides.

FORREST R. HURLEY.

REFERENCES CITED

The following references are of record in the file of this patent:

UNITED STATES PATENTS

| Number | Name | Date |
| --- | --- | --- |
| 1,881,927 | Pott et al. | Oct. 11, 1932 |